Patented Oct. 10, 1950

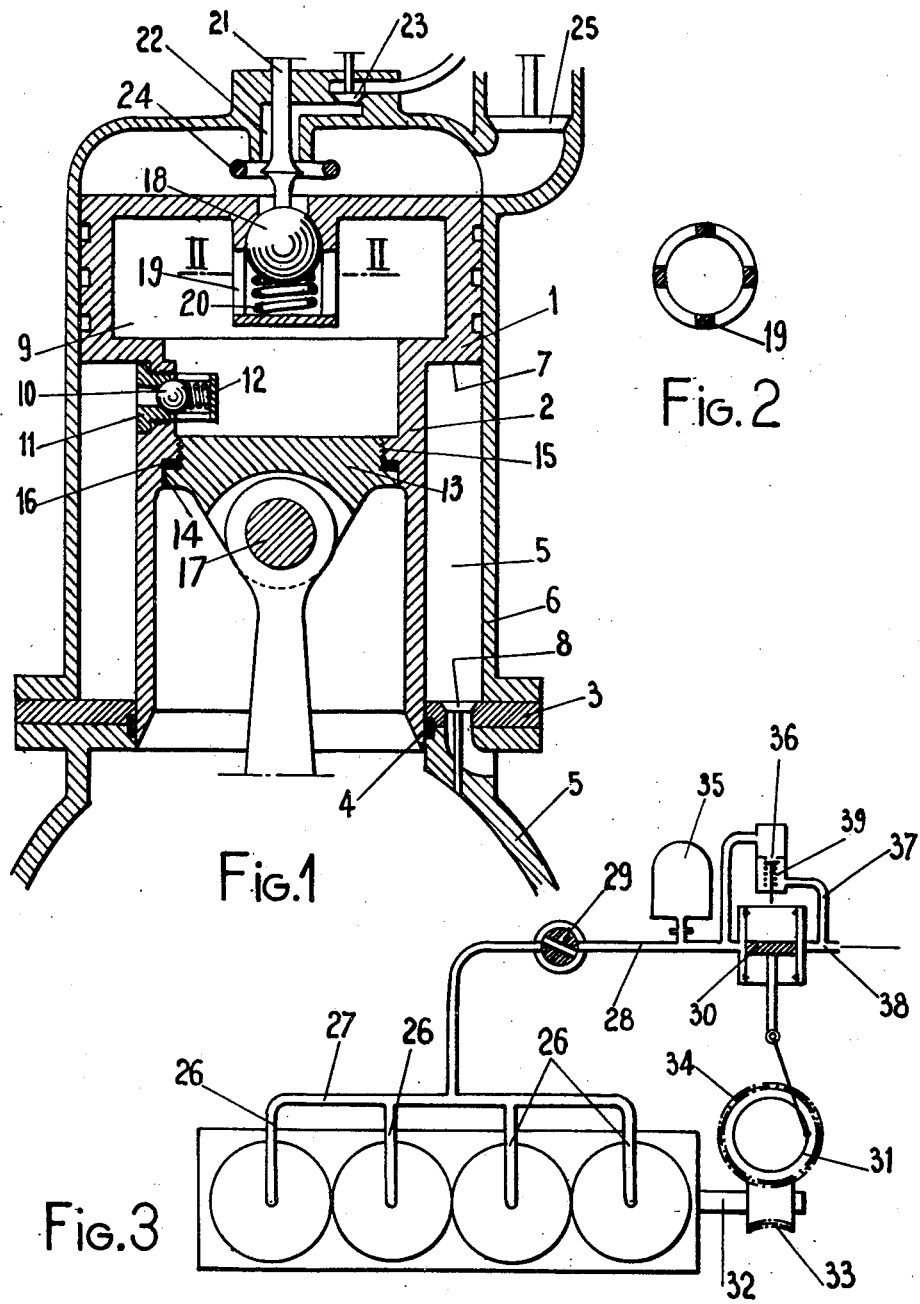

2,525,271

UNITED STATES PATENT OFFICE 2,525,271

INTERNAL-COMBUSTION ENGINE WITH COMPLETE EXPANSION

Georges Quint, Saint-Quentin, France

Application December 26, 1947, Serial No. 793,929
In France June 28, 1946

Section 1, Public Law 690, August 8, 1946
Patent expires June 28, 1966

8 Claims. (Cl. 123—71)

1

The present specification has for its object a type of internal combustion engine in which the liquid fuel is injected into the combustion chamber, the air of which has been raised in pressure beforehand and forced in by a volumetric compression-pump. The distinguishing feature of this engine lies in the fact that predetermined amounts of air and fuel are fed into the combustion chamber during normal running in a manner such that the pressure of the expanded burnt gas may be very close to atmospheric pressure.

This cycle differs from that of the Diesel engine since the engine, according to the invention, runs on a two-stroke instead of a four-stroke cycle, and the volume of air employed per revolution is less than that of the cylinder displacement. In the cycle according to the invention, the pressure of the air must be so regulated that, after contribution of the power furnished by the burning of the fuel and expansion of the explosive mixture, the pressure may drop to that of the atmosphere. This cycle is similar to the two-stroke cycle of injection engines since it gives a power stroke per revolution of the driving shaft, but in comparison to the standard cycle it effects a substantial saving in fuel consumption per horsepower-hour.

Its working stages are as follows:

With the piston at its upper dead centre at the end of exhaust, there are only burnt gases at atmospheric pressure within the combustion chamber. A charge of previously-compressed air is forced for a minute fraction of time into the combustion chamber.

The piston starts to go down towards its lower dead centre and fuel is injected into the combustion chamber and burns as long as any fuel is fed into this chamber. During its downstroke the piston compresses in a reserve or auxiliary space the next air-charge that should be forced into the combustion chamber when the piston is again approaching its upper dead centre.

At the end of the expansion stroke, the pressure of the burnt gases is near that of the atmosphere.

During its upstroke, the piston drives out the burnt gases at atmospheric pressure and on getting close to its upper dead centre, the compressed air-charge is forced into the combustion chamber at the same time as the exhaust valve closes.

In one of its forms of execution, the engine as specified has the following outstanding points that may be used separately or associated as desired.

(a) The engine piston serves also as the piston of a volumetric pump for compressing the charge

2 of air to be forced into the combustion chamber; it includes a skirt of smaller diameter that provides between itself and the cylinder wall an annular space that forms the body of the pump and is closed by a partition placed between the crank case and the base of the cylinder, in which the skirt, that forms part of the piston, slides.

(b) A hollow part is provided in the piston and connects, on the one hand, with the annular pump body through a valve that forms the delivery-valve into this space within the piston and, on the other hand, with the combustion chamber of the cylinder through a valve controlled so as to open when the piston is close to its upper dead point.

(c) The valve that checks the communication between the reserve compressed-air chamber in the piston and the combustion chamber in the cylinder is opened by a controlled push-rod.

(d) The injection of fuel into the cylinder is effected by a double-acting pump that delivers into an admission manifold connected to all the injectors of a multicylinder engine, through a regulator of the delivery such as a cock or similar contrivance.

(e) The regulator of the fuel delivery to the injectors is controlled by the accelerator.

(f) An air-chamber is provided on the delivery of the fuel pump for regulating the pressure, with the latter restricted by an adjustable return-spring valve that affords a communication between the delivery and inlet of the pump.

(g) Through a set of suitable gears placed between the driving shaft and the cam shaft the cam shaft may be made to rotate in either direction.

The accompanying diagrammatic drawings illustrate, only as examples, engines incorporating the various points that are set forth above. In said drawings:

Figure 1 is an axial section of the assembly of a single-cylinder engine.

Figure 2 is a cross-section along the line II—II of Fig. 1.

Figure 3 is a diagram showing the arrangement of the fuel-feed system of a four-cylinder engine.

In the setup of a single-cylinder engine as shown in Figures 1 and 2 the piston 1 includes a cylindrical skirt 2 of reduced diameter that slides in an airtight manner in a dividing plate 3 provided on the casing of the cylinder 6 with a suitable airtight joint 4. An annular airtight space is thus provided between the skirt 2 and the cylinder 6 and forms an annular pump body or chamber 5 of a compressed air pump. This pump may include no clearance-space except that derived from the reduced clearance to be arranged, so as to make allowance for expansion between the upper surface of the dividing-plate 3 and the opposite surface 7 on the shoulder of the piston body. The chamber 5 communicates with the atmosphere through a valve 8 that opens automatically and is returned to its seat by a light spring (not shown). It communicates furthermore with another chamber 9 arranged in the piston body itself through a valve 10 that forms the delivery-valve of the compressed air pump. This valve 10 may for instance be a ball-valve arranged in a valve-case 11 screwed into a thread of the piston wall and suitably fitted up to hold the return spring 12 of the ball 10. The chamber 9 is closed, for instance, by a built-up base 13 that is centered in the skirt 2 at 14 and that is locked by being screwed at 15 over a suitable airtight joint 16. This base-piece 13 is fitted with bearings or bearing surfaces 17 to take the end of the connecting rod.

The piston chamber 9 may communicate besides with the combustion chamber in the cylinder through a valve 18 that is likewise, and preferably, a ball-valve arranged in a case 19 and forced back on its seat by a spring 20. The opening of this valve is effected by a push-rod 21 that passes in an airtight way through the cylinder head and is controlled, at a suitable moment in the working cycle, by a cam that is timed by the shaft movement. This push-rod may pass through the inlet channel 22 feeding the cylinder with fuel delivered at the correct stage of the cycle by means of a pump that will be described later. Fuel is delivered into the cylinder through a valve 23 actuated by a suitable cam. As soon as it is injected into the combustion chamber, the fuel is ignited by coming in contact with a coil 24 that is made sufficiently hot by an electric current flowing through a resistance i. e. by a Joule effect as provided by connecting up the coil with any suitable battery. Owing to this permanent form of igniter, there will be a burning of the fuel as long as there is any explosive mixture in the combustion chamber.

The working stages are as follows:

When the piston comes up from its lower dead centre to the upper dead centre, the annular pump body 5 fills with air drawn in from the outside through valve 8. The chamber of the pump is full when the piston reaches its upper dead centre. When it sinks towards its lower dead point, air from the pump body 5 is delivered inside the chamber 9 by release of valve 10. The transference into the chamber 9 of the air, previously sucked in by the pump, may be regarded as complete except for the clearance-space. The air-pressure in chamber 9 depends on the ratio between the capacity of the annular space 5 and that of chamber 9.

The pressure in said transfer chamber should be higher than that in the combustion chamber but with a difference as small as possible in order to reduce the work absorbed by compression, said pressure being equal to $$Pt = H \times \frac{Vt}{Va} \times \frac{Tt}{Ti}$$

H designating atmospheric pressure,
V$t$ the volume of the transfer chamber,
V$a$ the volume of the annular cylinder and $$\frac{Tt}{Ti}$$

being the ratio between the absolute temperatures before and after compression.

When the piston goes up towards its upper dead centre, the chamber 9 remains shut and when it is just on the point of reaching its upper dead centre, the push-rod 21 opens the valve 18. A portion of the compressed air contained in chamber 9 enters the combustion chamber and, when the piston is actually at its upper dead centre, with the exhaust valve 25 closed at the correct stage of the cycle, the combustion chamber contains a charge of air at a predetermined pressure that is obviously less than that prevailing in the chamber 9 upon opening thereof. It may be noted that this charge of air remains constant whatever the running of the engine may be. It is, in fact, for a given atmospheric pressure and a given equilibrium temperature of piston and cylinder wall, defined precisely by the respective capacities of the pump body 5, of the chamber 9 and of the combustion chamber.

When the piston starts to come down again towards its lower dead centre the fuel is let into the combustion chamber and is ignited at once. The period of its injection depends on the contour of the cam controlling the valve 23 and its delivery may be altered as will be explained further on. When running on full power, the combustion chamber should receive only the fuel charge required for burning the whole volume of air that forms the charge previously introduced into this same chamber. In every case, according to the fundamental feature of the invention, the pressure at the end of expansion is at most equal to atmospheric pressure.

Multi-cylinder engines obviously may be constructed with each cylinder arranged as set out above, or arranged to operate on the same principle. It will be readily understood, in fact, that the volumetric compressed-air pump does not have to be in one with the engine piston. This pump may be an independent unit, but it is clearly timed to function in synchronism with the driving shaft. It may deliver into a reserve chamber such as 9 that is not necessarily arranged in the body of the piston as set out in the design of Figure 1.

In the diagram of Figure 3, a design is shown of a four-cylinder engine into each cylinder of which the fuel is brought through a pipe 26 branching from an admission manifold 27 connecting with the fuel-pump delivery through a pipe 28 on which is placed a delivery regulator such as a cock 29 or something similar to it, of which the plug is connected so as to correspond to the movement of the accelerator in the case of the engine driving an automobile.

The fuel-pump is advisedly a double-acting volumetric pump of which the piston 30 is controlled, for instance, by a disc-crank 31 connected through a set of gears of suitable ratio to the driving shaft 32. In the diagram, a worm gearing 33 has been shown as keyed at the end of the driving shaft and geared with a worm wheel 34 that forms part of the control gear of the disc-crank 31.

In order to steady the delivery pressure of the pump, provision may be made on the delivery pipe 28, on the upflow side of cock 29, of an air-chamber 35. Delivery pressure is restricted to a figure that is regulated by the adjustment of a clack or valve 36 placed in the by-pass pipe 37 that connects the delivery 28 with the suction 38 of the pump. A spring 39 of which the tension may be regulated by any suitable means, forces the valve 36 back to its seat. When the delivery pressure reaches a predetermined maximum, the valve 36 opens and connects the delivery up with the inlet.

The internal combustion engine operating a complete expansion in accordance with my invention shows the unquestionable advantage of consuming per H. P. and per hour less fuel than any engine now extant by reason of the improvement of the thermodynamic efficiency due to the increase of the expansion.

Another considerable advantage of such an engine resides in the fact that it may be reversed provided there is inserted between the driving shaft and the camshaft a gear work for allowing the rotation of the camshaft in either direction as required. This feature is of particular interest in the case of application to engines used for navigation purposes as they allow in this case doing away with all reversing gears.

As may be readily understood, the engine according to the invention may operate on a great variety of fuels, even the least volatile with a high flash-point. The embodiments as illustrated and outlined are given only as examples; the principles of its design are brought out above and the invention included within its scope as defined in accompanying claims all modifications that may be resorted to for putting these principles into practice.

What I claim is:

1. In an internal combustion engine, the combination of at least one cylinder, a normally closed hollow piston adapted to reciprocate therein and including a skirt of reduced diameter forming with the inner wall of the cylinder a variable volume air compression chamber, a partition at the outer end of the cylinder cooperating with the skirt for closing said chamber and input and delivery means for the compression chamber, a valve inserted between the closed chamber in the piston body and the combustion chamber, a second valve inserted between the combustion chamber and the annular air compression chamber, and an abutment adapted to open the first valve when the piston approaches its upper dead center, the second valve opening under the action of the compressed air in the compression chamber.

2. In an internal combustion engine, the combination of at least one cylinder, a normally closed hollow piston adapted to reciprocate therein and to define a combustion chamber wherewith and including a skirt of reduced diameter forming with the inner wall of the cylinder a variable volume air compression chamber, a partition at the outer end of the cylinder cooperating with the skirt for closing said chamber and input and delivery means for the compression chamber, a valve inserted between the closed chamber in the piston body and the combustion chamber, a second valve inserted between the combustion chamber and the annular air compression chamber, an abutment adapted to open the first valve when the piston approaches its upper dead center, the second valve opening under the action of the compressed air in the compression chamber, a pump adapted to deliver liquid fuel into the combustion chamber of the cylinder and means for adjusting the output of said pump.

3. In an internal combustion engine, the combination of at least one cylinder, a hollow piston adapted to reciprocate therein and including a skirt of reduced diameter forming with the inner wall of the cylinder a variable volume air compression chamber, a partition at the outer end of the cylinder cooperating with the skirt for closing said chamber, input and delivery means for the compression chamber, valves inserted between the closed chamber in the piston body and respectively the combustion chamber and the annular air compression chamber and timed means adapted to open the first valve when the piston approaches its upper dead center, the second valve opening under the action of the compressed air in the compression chamber, a double acting pump adapted to deliver liquid fuel into the combustion chambers of the different cylinders of the engine and means for adjusting the common output of said pump feeding said combustion chambers, an air containing chamber associated with the fuel delivery end of the pump for regularising the delivery pressure of said pump and an adjustable by-pass connected across the pump.

4. In an internal combustion engine, the combination of at least one cylinder, a hollow piston adapted to reciprocate therein and including a skirt of reduced diameter forming with the inner wall of the cylinder a variable volume air compression chamber, a partition at the outer end of the cylinder cooperating with the skirt for closing said chamber and input and delivery means for the compression chamber, valves inserted between the closed chamber in the piston body and respectively the combustion chamber and the annular air compression chamber, timed means adapted to open the first valve when the piston approaches its upper dead center, the second valve opening under the action of the compressed air in the compression chamber, a double acting pump adapted to deliver liquid fuel into the combustion chambers of the different cylinders of the engine, means for adjusting the common output of said pump feeding said combustion chambers, an air containing chamber associated with the fuel delivery end of the pump for regularising the delivery pressure of said pump, an adjustable by-pass connected across the pump, a shaft driven by the different pistons of the engine, a camshaft controlled thereby and means for reversing the relative direction of movement between the driving shaft and the cam shaft.

5. In an internal combustion engine, the combination of at least one cylinder, a closed hollow piston adapted to reciprocate therein and including a skirt of reduced diameter forming with the inner wall of the cylinder a variable volume air compression chamber, a partition at the outer end of the cylinder cooperating with the skirt for closing said chamber and input and delivery means for the compression chamber, a valve inserted between the closed chamber in the piston body and the combustion chamber, a second valve inserted between the combustion chamber and the annular air compression chamber, and an abutment extending from said cylinder in said combustion chamber and adapted to open the first valve when the piston approaches its upper dead center, the second valve opening under the action of the compressed air in the compression chamber.

6. In an internal combustion engine, the combination of at least one cylinder, a normally closed hollow piston adapted to reciprocate therein and including a skirt of reduced diameter forming with the inner wall of the cylinder a variable volume air compression chamber, a partition at the outer end of the cylinder cooperating with the skirt for closing said chamber, input and delivery means for the compression chamber, a valve inserted between the closed chamber in the piston body and the combustion chamber, a second valve disposed intermediate the combustion chamber and the annular air compression chamber, and timed means adapted to open the first valve when the piston is near its inward dead center, the second valve operable to open under the action of the compressed air in the compression chamber, a pump adapted to deliver liquid fuel into the combustion chamber, means for adjusting the output of said pump, including an air containing chamber associated with the fuel delivery end of the pump for regulating the delivery pressure of said pump and an adjustable by-pass connected across the pump.

7. In an internal combustion engine adapted to deliver reversible rotational output power, the combination of at least one cylinder, a closed hollow piston adapted to reciprocate therein and including a skirt of reduced diameter forming with the inner wall of the cylinder a variable volume air compression chamber, a partition at the outer end of the cylinder cooperating with the skirt for closing said chamber, receiving and delivery means for the compression chamber, a valve inserted between the closed chamber in the piston body and the combustion chamber, a second valve disposed intermediate the combustion chamber and the annular air compression chamber, timed means adapted to open the first valve when the piston is near its inward dead center, the second valve operable to open under the action of the compressed air in the compression chamber, a pump adapted to deliver liquid fuel into the combustion chamber, means for adjusting the output of said pump, including an air containing chamber associated with the fuel delivery end of the pump for regulating the delivery pressure of said pump, and an adjustable by-pass connected across the pump, a shaft driven by the piston of the engine, and arranged to control said valve opening means in either rotational direction of output from said shaft.

8. In a two-cycle internal combustion engine, in combination, a cylinder having a sidewall, an end wall and opposite thereto a restricted area surrounding an opening, a piston reciprocable in said cylinder and including an end portion opposite said cylinder end wall for forming therewith a combustion chamber and including a recessed portion spaced from said end portion and being slidable in said opening and forming with the cylinder sidewall an annular compression chamber, and arranged to cooperate with said restricted area to compress air in said compression chamber during the outward stroke of said piston, said piston being hollow on the interior enclosing an air chamber and having in said recessed portion a first passage for intercommunication between said air chamber and said annular compression chamber and having in said end portion a second passage for intercommunication between said air chamber and said combustion chamber, a movable valve in each passage biased for normally closing the same to seal said air chamber, the valve in said first passage arranged to be opened in response to a predetermined pressure differential between said annular compression chamber and said air chamber for admitting compressed air into said air chamber, valve operating means extending in said combustion chamber opposite said second passage and arranged to make abutment contact for a selected time period with the valve of said second passage for forcibly opening the same from the exterior of said piston at a predetermined distance of said piston end portion from said cylinder end wall near the inwardmost position of said piston, whereby at least a portion of the compressed air will be discharged from said air chamber into said combustion chamber.

QUINT, GEORGES.

REFERENCES CITED

The following references are of record in the file of this patent:

UNITED STATES PATENTS

| Number | Name | Date |
|---|---|---|
| 841,830 | Wackenhuth | Jan. 22, 1907 |
| 1,367,037 | Gall | Feb. 1, 1921 |
| 1,535,657 | Ensign | Apr. 28, 1925 |
| 1,767,506 | Brockway | June 24, 1930 |
| 2,082,078 | Ottoson | June 1, 1937 |
| 2,227,896 | Fitzgerald | Jan. 7, 1941 |